United States Patent
Leroux

(10) Patent No.: US 9,344,860 B2
(45) Date of Patent: May 17, 2016

(54) MOBILE DEVICE CONTROL WITH EXTERNAL DEVICE

(76) Inventor: Maximilian Leroux, Boston, MA (US)

( * ) Notice: Subject to any disclaimer, the term of this patent is extended or adjusted under 35 U.S.C. 154(b) by 36 days.

(21) Appl. No.: 13/884,659

(22) PCT Filed: Nov. 12, 2010

(86) PCT No.: PCT/FI2010/050910
§ 371 (c)(1),
(2), (4) Date: May 10, 2013

(87) PCT Pub. No.: WO2012/062955
PCT Pub. Date: May 18, 2012

(65) Prior Publication Data
US 2013/0231055 A1    Sep. 5, 2013

(51) Int. Cl.
*H04B 7/00* (2006.01)
*H04W 4/10* (2009.01)
*H04M 1/60* (2006.01)
*H04M 1/725* (2006.01)

(52) U.S. Cl.
CPC .............. *H04W 4/10* (2013.01); *H04M 1/6066* (2013.01); *H04M 1/72527* (2013.01)

(58) Field of Classification Search
CPC . H04M 1/6066; H04M 1/72527; H04M 4/10; H04M 4/08
USPC ........................................................ 455/41.2
See application file for complete search history.

(56) References Cited

U.S. PATENT DOCUMENTS

| | | | |
|---|---|---|---|
| 7,970,342 B1* | 6/2011 | Griffin | 455/3.06 |
| 2005/0143135 A1* | 6/2005 | Brems et al. | 455/564 |
| 2005/0159175 A1* | 7/2005 | Zhou et al. | 455/466 |
| 2007/0133514 A1* | 6/2007 | Nelson | H04M 1/2535 370/352 |
| 2008/0119179 A1 | 5/2008 | Lay et al. | |
| 2010/0039229 A1* | 2/2010 | Westerlund | A62B 18/08 340/10.1 |
| 2010/0088100 A1* | 4/2010 | Lindahl | 704/270.1 |
| 2010/0137015 A1* | 6/2010 | Blanco | 455/518 |
| 2010/0293462 A1* | 11/2010 | Bull et al. | 715/716 |
| 2011/0034126 A1* | 2/2011 | Higgins | H04W 4/10 455/41.2 |

FOREIGN PATENT DOCUMENTS

| | | |
|---|---|---|
| EP | 2230605 A1 | 9/2010 |
| WO | 2007066174 A1 | 6/2007 |

OTHER PUBLICATIONS

International Search Report, dated Aug. 22, 2011, from corresponding PCT application.

* cited by examiner

*Primary Examiner* — Wesley Kim
*Assistant Examiner* — Raj Chakraborty
(74) *Attorney, Agent, or Firm* — Young & Thompson

(57) ABSTRACT

A mobile arrangement (102), such as a mobile communication device, including a user interface (UI) configured to receive user input, a wireless data transfer interface configured to receive a command, such as a PTT (Push-to-Talk) command, sent by an RSM (Remote Speaker Microphone) device (104a, 104b) or other accessory, such as an in-car device or a headset, wirelessly connected to the mobile arrangement, and an interfacing logic (114) configured to map the received command to a predetermined command locally providable via the user interface to a communication application (112) running on the mobile arrangement and capable of receiving user input via the user interface so as to enable utilization of the communication application through the RSM or other accessory. Corresponding method and computer program product are presented.

14 Claims, 3 Drawing Sheets

MOBILE DEVICE CONTROL WITH EXTERNAL DEVICE

FIELD OF THE INVENTION

The present invention relates generally to wireless communication. In particular, however not exclusively, the present invention pertains to the utilization of an accessory such as an RSM (Remote Speaker Microphone) device in connection with a mobile device capable of executing various applications.

BACKGROUND

There's a plethora of providers in Push-to-Talk (PTT), Voice-over-IP (VoIP) and similar communication software for a few operating system platforms already on the market, i.e. Windows Mobile, Android and S60. These operators focus on the usability of a mobile device itself as a standalone communication device and conjecture that a user interacts with a communication application solely through the mobile device's built-in user interface, typically nowadays a keypad or a touch screen.

To support a certain accessory such as a certain RSM device, each application developer would in practice be required to modify their software in co-operation with the RSM device manufacturer. This is unfeasible while tens of these applications developers would needed to be persuaded to support each potential device by the RSM manufacturers.

For example, sending PTT commands over a Bluetooth (BT) link is not supported by the existing BT standards. An RSM device thus needs specific firmware and software to generate PTT commands understood by a predetermined communication application like Push to Talk over Cellular (PoC) application running on the applied mobile device. Correspondingly, the PoC-application requires RSM manufacturer-specific support to be able to interpret the received proprietary commands.

SUMMARY

It is therefore an object to at least alleviate one or more of the aforementioned defects associated with the utilization of accessories such as RSM devices, hereinafter RSM, in connection with mobile devices capable of running a number of communications applications.

The objective is achieved via the arrangement, computer program product and method in accordance with the present invention.

In one aspect, a mobile arrangement, such as a mobile communication-enabled device, comprises a user interface, such as a keypad, configured to receive user input, a wireless data transfer interface, such as Bluetooth-compliant interface, configured to receive a command, such as a PTT command, sent by an external accessory, such as an RSM device, wirelessly connected to the mobile arrangement, and an interfacing logic configured to map the received command to a predetermined command locally providable via the user interface to a communication application running on the mobile arrangement and capable of receiving user input via the user interface so as to enable utilization of said communication application through the accessory.

For instance, a function of a communication application, such as a PTT request, may be linked with a certain UI feature, such as a key/button (e.g. 'PTT' button), such that the activation of the certain UI feature (depressing the button, for example) then generates an input signal commanding the application to trigger the function. The mapping feature disclosed above may generate such a signal in response to the received accessory-originated, potentially user-initiated (e.g., via button press or other UI feature) command to imitate true locally provided user input.

In one embodiment, the interfacing logic may be at least partially user-controllable. For example, the user may determine the association between the command sent by the accessory such as the RSM and the command providable by the local UI, such as by a PTT button, touch screen or keypad of the mobile device. The interfacing logic may be configured to request from the user, upon receiving a command sent by the accessory, an associated local command providable via the local UI. Among other options, visual instructions and/or auditive instructions may be output to the user of the mobile arrangement asking the user to apply, such as depress, a local UI feature to be mated with the received remote command. The logic may be thus trained.

In another, either supplementary or alternative, embodiment the interfacing logic may host a plurality of associations between a number of accessory-originated commands and a number of local commands.

In a further, either supplementary or alternative, embodiment the interfacing logic may host associations between a plurality of communication applications and an accessory such as an RSM in terms of related commands. A first received external, i.e. accessory-originated, command may be associated with a first local user input command addressed to a first communication application. A second accessory-originated command may be associated with a second local user input command addressed to a second communication application. Thus, a plurality of commands provided by an accessory may be associated with a plurality of local commands and/or communication applications, respectively.

The interfacing logic may be configured to host associations between a plurality of communication applications and a plurality of accessory devices in terms of related commands. Each accessory may be associated with a number of communication applications.

Yet in a further, either supplementary or alternative, embodiment an accessory-originated command may be associated with a plurality of local commands to be generated in response. Alternatively or additionally, a plurality of accessory-originated commands, received in sequence, for example, may be associated with a certain local command.

Still in a further, either supplementary or alternative, embodiment, the interfacing logic may host a number of optionally user-selectable and/or controllable configurations, each configuration comprising at least a number of, potentially a plurality of, associations, wherein each association links at least one accessory-originated command to at least one local user input command.

In a further, either supplementary or alternative, embodiment software such as middleware comprising computer code to carry out at least part of the interfacing logic may be installed at the mobile arrangement.

In another aspect, a computer readable medium storing a computer program, which when executed by a computer of a mobile device, causes the computer to receive a command, such as a PTT command, sent by an accessory such as an RSM device preferably wirelessly to the mobile device, and to map the received command to a predetermined command locally providable via the user interface of the device to a communication application running on the device and capable of receiving user input via the user interface so as to enable utilization of the communication application through the accessory.

In a further aspect, a method for a mobile device comprises receiving a command, such as a PTT command, sent by an accessory such as an RSM device preferably wirelessly to the mobile device, and converting the received command into a predetermined command locally providable via the user interface of the device to a communication application executed on the device and capable of receiving user input via the user interface so as to enable utilization of the communication application through the accessory.

The previously presented considerations concerning the various embodiments of the arrangement may be flexibly applied to the embodiments of the method or computer program mutatis mutandis, and vice versa, as being appreciated by a skilled person.

The utility of the present invention follows from a plurality of issues depending on each particular embodiment. The suggested solution potentially enables flexibly relaying user-initiated and optionally also other commands from various wireless accessories, such as RSM devices, to various different target applications such that the applications may exclude specific support for any particular, possibly proprietary, messaging scheme used by the accessories, for example. The received command causes the generation of a locally providable command, understood by the target application, and forwarding thereof to the application. The received and/or locally generated associated command may refer to a signal indicative of an UI feature state change, such as a signal indicative of a button or key press, and/or to more complex command, such as application context-dependent command message, such as a request for transmission permission (PTT command). The configurability of the solution facilitates tailoring it according to any user's needs and in view of various different use scenarios. As a result, e.g. third party communication application manufacturers and accessory such as in-car electronics, headset and RSM manufacturers do not have to provide direct support to each other's products nor support to any particular middleware as the embodiments of the present solution are preferably transparent from the standpoint of the applications and accessory devices and can be adapted to interconnect practically any RSM or other accessory with any communication application normally utilizing the integrated UI of the mobile device for input purposes.

The embodiments of the present invention may be implemented as computationally light, memory-efficient and simple to use computer software, whereupon new hardware is in most cases not necessary.

A number of exemplifying embodiments of the invention are described in accompanied dependent claims.

The verb "to comprise" is used in this document as an open limitation that neither requires nor excludes the existence of also unrecited features.

The expression "a number of" refers herein to any positive integer starting from one (1), e.g. to one, two, or three.

The expression "a plurality of" refers herein to any positive integer starting from two (2), e.g. to two, three, or four.

The expression "data transfer" may refer to transmitting data, receiving data, or both, depending on the role(s) of a particular entity under analysis relative a data transfer action, i.e. a role of a sender, a role of a recipient, or both.

The terms "a" and "an" do not denote a limitation of quantity, but denote the presence of at least one of the referenced item.

The terms "first" and "second" do not denote any order, quantity, or importance, but rather are used to distinguish one element from another.

BRIEF DESCRIPTION OF THE FIGURES

Various embodiments of the invention presented in the sense of examples and their potential advantages are explained in greater detail below with reference to the accompanying drawings, in which.

DETAILED DESCRIPTION

Figure 1:
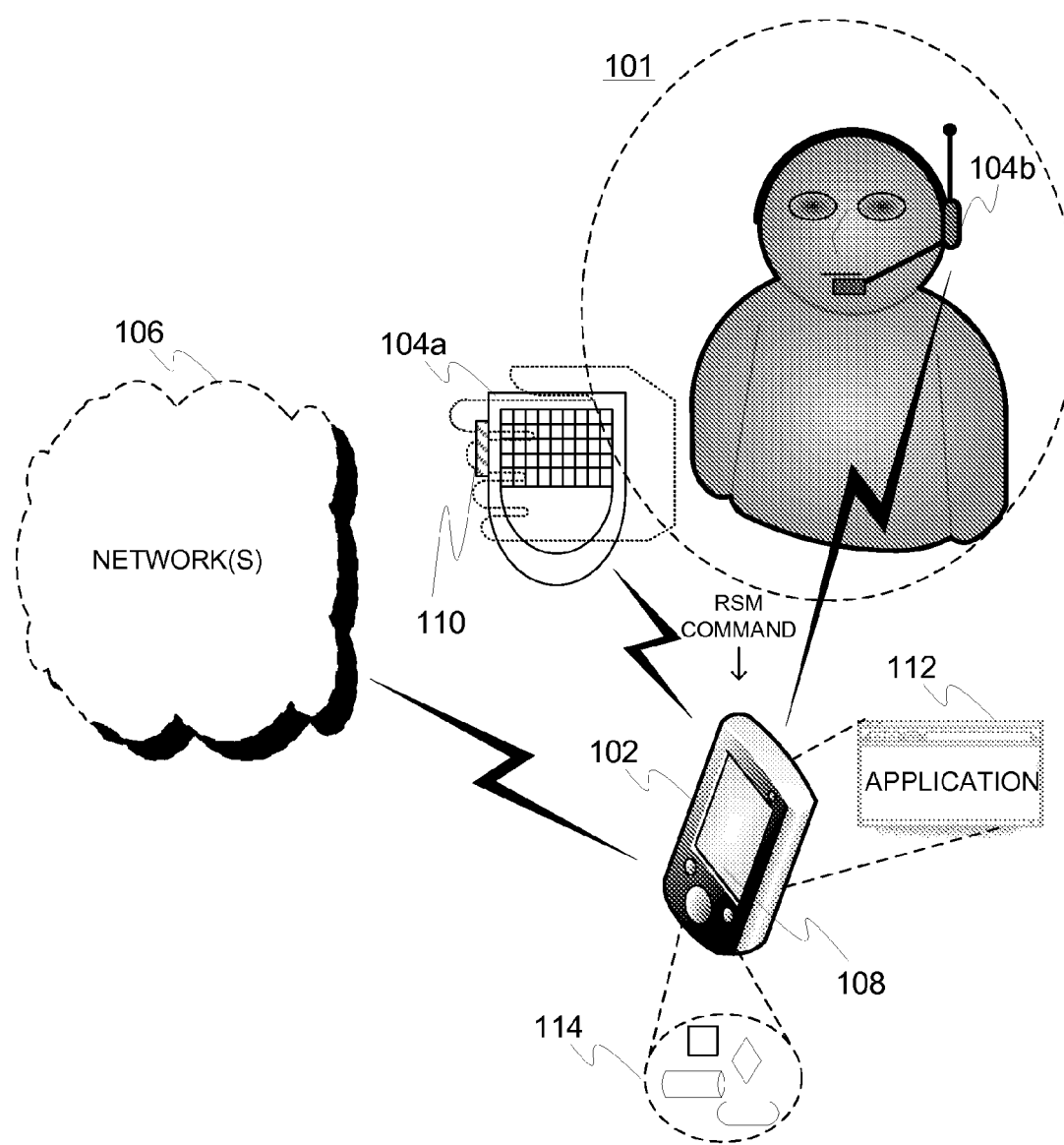
FIG. 1 depicts the concept of the present invention via illustrating two embodiments of a related arrangement and a potential use scenario.

FIG. 1 (not in scale) illustrates the concept of the present invention via two mutually alternative or supplementary embodiments thereof. The user entity 101 may be provided with a mobile device 102, such as a cellphone, a smartphone, a walkie-talkie, or a communication-enabled PDA (personal digital assistant), capable of wireless communication with a remote party optionally via at least one network infrastructure 106, such as a cellular network, a wireless local area network, etc.

An accessory, such as an RSM 104a, 104b (headset, which may be a stand-alone headset potentially with own UI feature(s) such as a PTT button, or a supplementary headset to be used in connection with other device(s) such as the RSM 104a), may be wirelessly providing data including e.g. user-initiated commands (e.g. PTT, see UI feature 110) and voice (typically speech) data to the mobile device 102 for use with a communication application 112 running thereon, for example. The communication application may be a PoC and/or VoIP application, for instance.

The mobile device 102 may comprise interfacing logic 114, such as middleware, to preferably automatically convert the received, accessory-originated command into a proper local counterpart, when possible. The mobile device 102 may contain a data repository such as a mapping table and/or a database (or "mapping rules" in general) for storing related mapping information enabling the generation of a proper local command based on the received remote one.

The mapping rules may be at least partially user-controllable, i.e. the user may affect the linkage between a received command and a local command providable via the built-in (local) UI 108 of the mobile device.

The interfacing logic may thus conceptually match a button or other UI feature on the accessory 104a, 104b with a button or other UI feature on the mobile device 102. This may be materialized such that as an activation of an RSM button or other UI feature causes a first, RSM-originated command, i.e. predetermined signal/data that can be interpret as a command, to be transmitted to the mobile device 102 and be thus detectable by the device 102, the received command (predetermined signal/data) may be mapped to an activation of an associated button or other local UI feature of the mobile device 102 by causing the receipt of the first command to locally generate, in the mobile device 102, a second command conventionally triggered by the direct local input via the UI.

The nature of the second command mimicking local UI input may differ between different embodiments of the present invention and even within a single embodiment. Namely, in some cases the second command may be related to a lower level command, e.g. for a lower level API, and in some other cases to a higher level command, e.g. for a higher level API. For example, the second command may just indicate an activation of a certain local UI feature, such as a certain button or key press, to the communication application, and/or it may directly indicate more cultivated, higher-level, information such as desired target function, e.g. a request for transmission permission (PTT), in which case the mobile device 102 may, externally to the actual communication application, first convert the UI input-related lower level information (e.g. a button press) to a higher-level more conceptual information (e.g. request for transmission permission), and then provide the application with at least the higher-level information.

The same generally applies to the first, i.e. RSM-generated, command. It may indicate a lower level action such as a certain key press taken place in the RSM 104a, 104b, and/or a higher level action like a request for transmission permission. Further, the first and/or second command may effectively indicate also both, as depressing a predetermined PTT button, for example, usually simultaneously implies also a request for transmission permission.

In some embodiments, the user may determine, such as select from a predetermined list or type in, a wirelessly received (RSM) command and an associated local UI input-based command utilizing the UI 108 of the mobile device 102, such as keypad (button(s)) or a touch screen, and that way facilitate the pairing procedure between the received RSM command and local user input.

In some embodiments, the mobile device 102 may be configured to monitor both the data traffic, such as a command received from the RSM, and the local UI input for pairing purposes.

The mobile device 102 may facilitate entering a pairing procedure. This may happen automatically upon receipt of an unrecognized command from the RSM and/or when requested by the user via the local UI 108. During pairing, the user may trigger sending an RSM-initiated command wirelessly to the mobile device 102 by operating associated UI feature of the RSM 104a, 104b. For example, an UI feature 110 such as a button like a PTT button of the RSM 104a, 104b may be activated, such as depressed and/or released, or voice input be given by the user to trigger the transmission, optionally in response to a corresponding request indicated by the mobile device 102 to the user via a display and/or loudspeaker, for example.

The mobile device 102 may acknowledge the receipt of an RSM command and optionally provide the user with an opportunity to check the received command e.g. via a display and further optionally to alter or change it, if needed.

Then the user may preferably apply the local UI 108 of the mobile device 102 to indicate the target command of the pairing action to the mobile device 102 optionally again in response to a corresponding request indicated by the mobile device 102 via a display and/or a loudspeaker, for example.

Advantageously the communication application 112 whereto the converted, now local-like input is provided may remain unaware of the actual origin (RSM) of the input. The interfacing logic 114 taking care of the conversion may preferably funnel the resulting RSM-triggered commands to the application 112 via the same interface as being used with commands truly locally input via the UI 108.

The UI of the RSM 104a, 104b and/or the mobile device 102 may support voice commands and include a speech recognition logic entity for the purpose. Different potential UI features are reviewed in more detail hereinafter.

Figure 2:
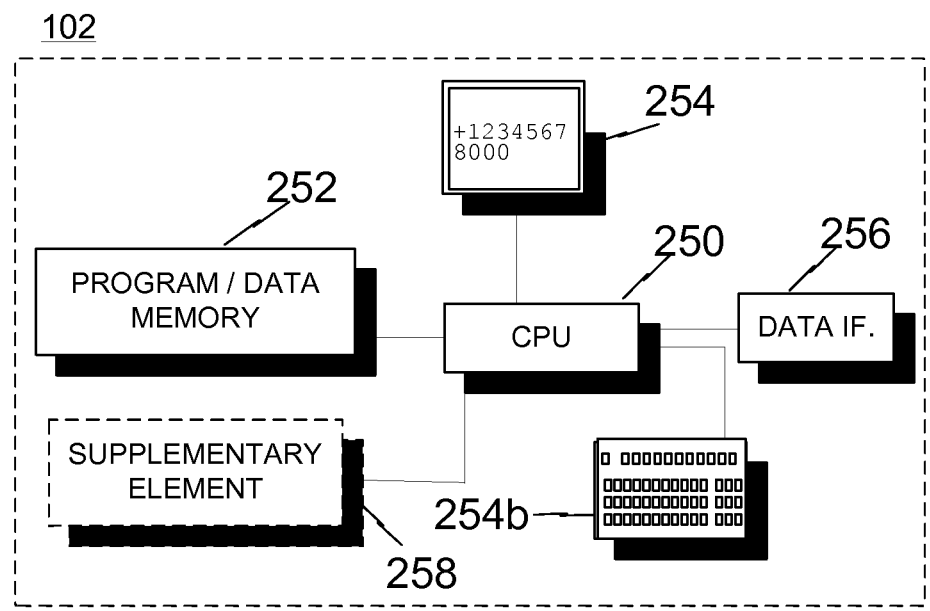
FIG. 2 is a block diagram of an arrangement in accordance with an embodiment of the present invention.

FIG. 2 is a block diagram illustrating the selected internals of an embodiment of the arrangement presented herein. Basically, an accessory, such as an RSM, could include similar entities as well depending on the embodiment thereof. The arrangement 102, such as a cell phone or PDA, may contain a number of at least functionally connected elements. The arrangement 102 is typically provided with one or more processing devices capable of processing instructions and other data, such as one or more microprocessors, micro-controllers, DSP's (digital signal processor), programmable logic chips, etc. The processing entity 250 may thus, as a functional entity, comprise a plurality of mutually co-operating processors and/or a number of sub-processors connected to a central processing unit, for instance. The processing entity 250 may be configured to execute the code stored in a memory 252, which may refer to instructions and data relative to the software logic and software architecture for controlling the arrangement 102. The processing entity 250 may at least partially execute and/or manage the execution of the afore-explained command handling tasks and thus implement the interfacing logic with the memory 252.

Similarly, the memory entity 252 may be divided between one or more physical memory chips or other memory elements. As alluded above, the memory 252 may store program code and other data such as command mapping information etc. The memory 252 may further refer to and include other storage media such as a preferably detachable memory card, a floppy disc, a CD-ROM, or a fixed storage medium such as a hard drive. The memory 252 may be non-volatile, e.g. ROM (Read Only Memory), and/or volatile, e.g. RAM (Random Access Memory), by nature. Software (product), such as the middleware, applied for implementing an embodiment of the present invention may be provided on a carrier medium such as a memory card, a memory stick, an optical disc (e.g. CD-ROM or DVD), or some other memory carrier.

The UI (user interface) 254, 254b may comprise a display or a data projector 254, and a keyboard/keypad or other applicable user (control) input entity 254b such as a touch screen and/or the aforementioned voice control input (requires a microphone or corresponding transducer), or a number of separate keys, buttons, knobs, switches, a touchpad, a joystick, and/or a mouse, configured to provide the user of the arrangement with practicable data visualization and device/application control features, respectively. The UI 254, 254b may include one or more loudspeakers and/or beepers (buzzers), and associated circuitry such as D/A (digital-to-analogue) converter(s) for sound output and/or a microphone with A/D converter for sound, e.g. speech, input. Further, an accelerometer may be used for providing user input. A tactile output device such as a vibration element may be applied for providing tactile output.

The arrangement 102 further comprises a data interface 156 such as a number of wireless and optionally wired transmitters, receivers, and/or transceivers for communication with other devices such as accessories, terminals or network infrastructure(s). For example, an integrated or a removable network adapter may be provided. Non-limiting examples of the generally applicable technologies include WLAN (Wireless LAN, wireless local area network), LAN, WiFi, Ethernet, USB (Universal Serial Bus), GSM (Global System for Mobile Communications), GPRS (General Packet Radio Service), EDGE (Enhanced Data rates for Global Evolution), UMTS (Universal Mobile Telecommunications System), WCDMA (wideband code division multiple access), CDMA2000, PDC (Personal Digital Cellular), PHS (Personal Handy-phone System), and Bluetooth.

The arrangement may be configured to apply already available and/or future variation(s) of the suitable technology/technologies and e.g. related standard(s). The same applies to the accessories regarding the communication with the arrangement.

It is clear to a skilled person that the arrangement 102 may comprise numerous additional functional and/or structural elements for providing advantageous communication, processing or other features, whereupon this disclosure is not to be construed as limiting the presence of the additional elements in any manner. Entity 258 refers to such additional element(s) potentially found useful depending on the embodiment.

Figure 3:
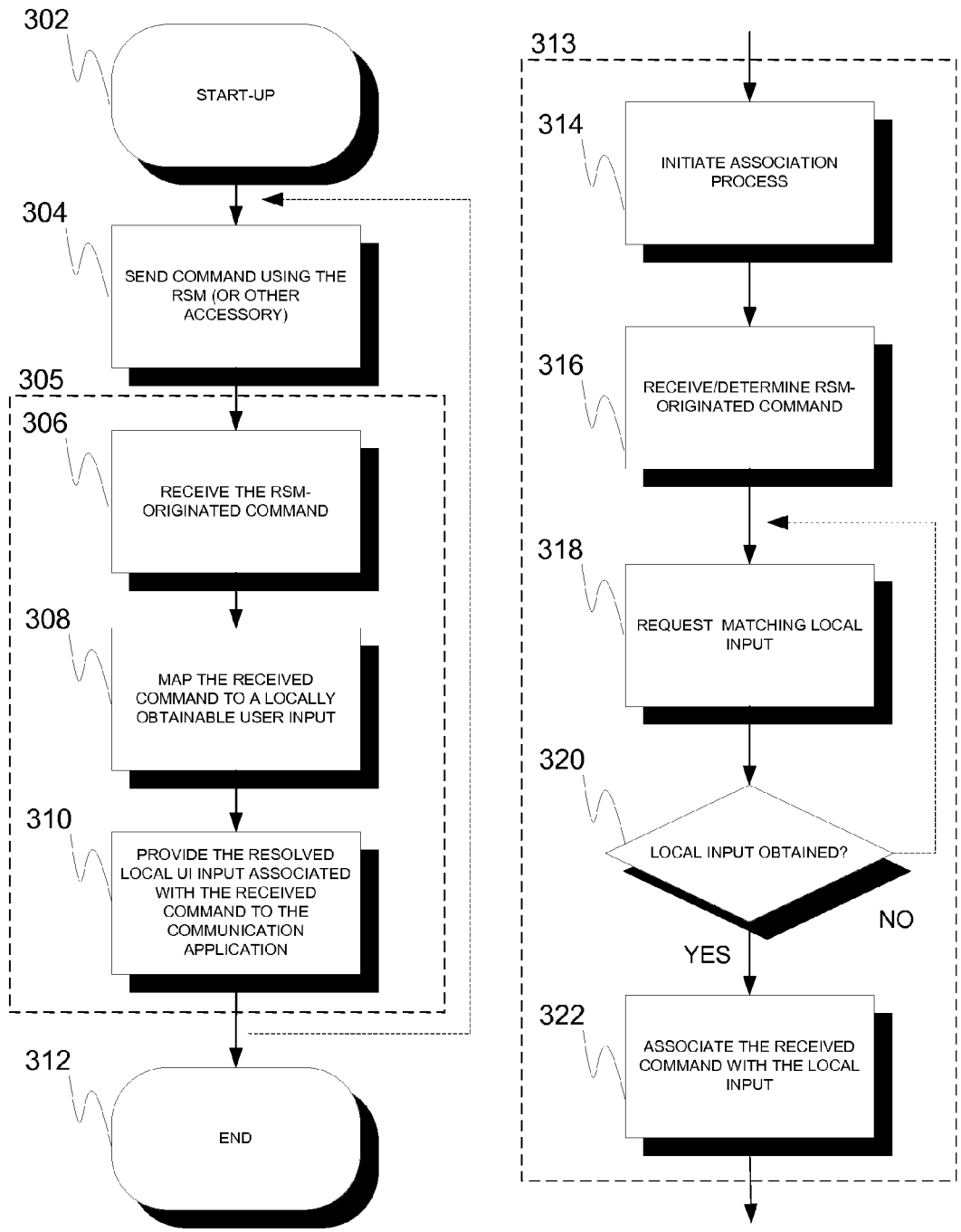
FIG. 3 is a flow chart of a method according to an embodiment of the invention for adapting the command control chain.

FIG. 3 discloses, by way of example only, a method flow diagram in accordance with an embodiment of the present invention. At 302 the arrangement of the present invention is obtained and configured, for example through loading and execution of related software, such as middleware, for managing relaying of accessory-originated commands. Configurations and associations, e.g. mappings between the accessory and local data, may also be determined at this point. At 304, the RSM (or other accessory) communicates preferably wirelessly a command, such as PTT initiation (triggering the voice transmission mode) or termination (switch back into voice reception mode) request in the case of e.g. half-duplex communication. The user of the RSM may have instructed, utilizing the UI of the RSM, such as a button thereof, the RSM to send such command(s).

The broken line at 305 indicates and surrounds the method items whereto the arrangement makes the most, if not all, contribution in contrast to the accessory, for instance.

At 306, the command is preferably wirelessly received by the arrangement. The command may indicate a lower level action such as a certain button press taken place in the RSM, and/or it may indicate a higher level action such as a permission-to-transmit (PTT) request as mentioned hereinearlier. At 308, the command is nevertheless mapped to an associated, locally obtainable user input-based command for a communication application so that the application may be subsequently provided with it, at 310, advantageously just as being obtained through the local UI. As a result, the application does not have to be tailored according to the peculiarities of any accessory manufacturer-specific signaling, and the arrangement may be flexibly configured to support a plurality of potentially even simultaneously running applications utilizing inputs originated from a number of preferably wirelessly connected external devices substantially transparently in the light of the applications.

As deliberated in the previous paragraphs, the nature of the command to be provided to the application may depend on the utilized platform and e.g. APIs (application-programming interfaces), and may vary between a simple indication of e.g. a button press or some other low-level physical interaction between the user and the arrangement, and an already-interpreted, higher-level command such as a request for transmission permission.

The execution is ended at 312. Naturally the execution of the method items may be repeated as new commands are sent from the accessory to the arrangement, which is highlighted by a dotted loopback arrow shown in the figure between items 310 and 304.

At 313, it is shown merely by example, how the pairing procedure between a received command and locally obtainable user input-like command could be carried out. At 314, the pairing, or "training", procedure is initiated, which may take place in response to an explicit request by the user via the UI to initiate it. In some embodiments, the user may be then provided, e.g. via the display, a request to trigger sending a command from the RSM or other accessory to the arrangement. Alternatively, the procedure may be initiated automatically upon receipt of an unrecognized command from the accessory such as an RSM device, for example.

At 316, the RSM-originated command is received in or otherwise indicated to the arrangement. The arrangement may be configured to monitor received data and automatically capture the command therefrom according to predetermined command recognition rule(s) applied by the interfacing logic.

In the case of multiple received potential commands (or data reminding of commands according to predetermined criteria), a list of potential commands may be visualized to the user for verification and selection of at least one received command for association with local UI input relative to at least one communication application.

In some embodiments, the user may at least partially manually define the RSM command to be associated with a local command via the UI of the arrangement. The user may, for example, type in or otherwise determine a bit sequence to be recognized from other data as the command.

Next, at 318, the user may be requested, e.g. via a display of the arrangement, to provide local input and thus, a local input command, to be associated with the RSM-originated command. For example, a request to activate an UI feature such as depressing a key may be provided. The user may then press a button on the UI to input the command, for example. The arrangement may monitor and capture the input (see item 320). At 322, the received local input is associated with the received RSM command. The association is stored in a repository such as a mapping table for future use. Yet, an indication of the identity of the target communication application may be stored in the mapping information so that even in the case of multiple applications running, the arrangement may address the generated local command to correct target application.

A skilled person will realize that e.g. the order of steps 316 and 318,320 may be reversed, i.e. the first the local input is determined after which the RSM command linked therewith is solved.

A computer program, comprising a code means adapted, when run on a computer, to execute an embodiment of the desired method items in accordance with the present invention, may be provided. A carrier medium such as an optical disc, floppy disc, or a memory card, comprising the computer program may further be provided. The program may be delivered over a communication network.

Consequently, a skilled person may on the basis of this disclosure and general knowledge apply the provided teachings in order to implement the scope of the present invention as defined by the appended claims in each particular use case with necessary modifications, deletions, and additions. For example, instead of communication application(s), other application(s) could be provided with local user input-emulating commands according to the principles set forth hereinbefore. Further, the locally generated commands could be other commands than user input-related commands.

Yet, instead of the pronouncedly set forth RSM, the applied accessory could practically be any other suitable device or an aggregate entity of a plurality of at least functionally connected elements external to the arrangement and feasible for controlling the arrangement-run target application. For example, different headsets or in-car, or generally in-vehicle, electronics device(s) or entitie(s), which may include command input and potentially also sound such as speech input element(s), may be mobilized for the purpose.

In some embodiments, an in-vehicle entity, which may refer to a multimedia control system or other substantially integrated user interface, for instance, can receive user input an indication of which is then relayed preferably wirelessly to the mobile arrangement for adaptation and delivery to the communication application. In a general sense, even the vehicle itself can be considered as the accessory from the standpoint of the mobile arrangement and the present invention.

Ultimately, instead of wireless communication, wired transmission could be applied between the accessory and the arrangement.

The invention claimed is:

1. A mobile arrangement including at least a mobile communication-enabled device, comprising:
    a user interface (UI) configured to receive user input;
    a wireless data transfer interface configured to receive at least Push-to-Talk (PTT) command sent by a remote speaker microphone (RSM) device that is wirelessly connected to the mobile arrangement; and
    an interfacing logic (114) configured to map the received command to a predetermined command locally provided via the user interface to a communication application running on the mobile arrangement and capable of receiving user input via the user interface so as to enable utilization of said communication application through the RSM,
    wherein the interfacing logic incorporates a middleware component configured to virtually operate controls of the UI in response to the command sent by the RSM responsive to a user action carried out by a user upon the RSM.

2. The mobile arrangement of claim 1, wherein mappings used by the interfacing logic to map the received command to a predetermined command locally is at least partially controllable by the user.

3. The mobile arrangement of claim 1, wherein, in order to create a mapping, a component is provided that prompts the user, via the UI, to operate an UI feature (110) of the RSM to trigger transmission and reception of the associated command to be associated with a user input command.

4. The mobile arrangement of claim 1, wherein, in order to create a mapping, a component is provided that prompts the user, via the UI, to provide a user input command and to associate the user input command, as said predetermined command, with the received command.

5. The mobile arrangement of claim 1, wherein the communication application utilized through the RSM is PoC (Push-to-Talk over Cellular) and/or VoIP (Voice over Internet Protocol) application.

6. The mobile arrangement of claim 1, configured to host a plurality of mappings, each mapping associating at least one received command with at least one communication application.

7. The mobile arrangement of claim 1, configured to host a plurality of mappings, each mapping associating at least one received command with at least one communication application, wherein at least one mapping relates to a first RSM and at least one other mapping relates to a second RSM.

8. A system, comprising an accessory (104a, 104b), and a mobile arrangement (102) according to claim 1.

9. The mobile arrangement of claim 3, wherein the UI feature (110) is a button.

10. A method for a mobile device comprising:
    at the mobile device, receiving a Push-to-Talk (PTT) command (306), wirelessly sent by a remote speaker microphone (RSM) device that is wirelessly connected to the mobile device; and
    at the mobile device, causing, responsive to the received command, an actuation of a corresponding control of a user interface of the device in order to actuate a predetermined command of a communication application (308, 310), operable on the device, that receives user input via the user interface of the device, thereby to operate the communication application by way of the RSM,
    wherein the processor-readable coded instructions incorporate a middleware component that virtually operates controls of the user interface of the device in response to user actions carried out by a user upon the RSM.

11. A non-transitory computer readable medium having recorded thereon a computer program comprising processor-readable coded instructions that, upon execution by a processor of a mobile device, causes the mobile device to execute steps of:
    receiving, at the mobile device, a Push-to-Talk (PTT) command (306) wirelessly sent by remote speaker microphone (RSM) device that is wirelessly connected to the mobile device; and
    causing, responsive to the received command, an actuation of a corresponding control of a user interface of the device in order to actuate a predetermined command of a communication application (308, 310), executed on the device, that receives user input via the user interface of the device, thereby to operate the communication application by way of the RSM,
    wherein the processor-readable coded instructions incorporate a middleware component that virtually operates controls of the user interface of the device in response to user actions carried out by a user upon the RSM.

12. The mobile arrangement of claim 1, comprising means to interpret predetermined signal/data as a command, to be transmitted to the mobile device, for the detection by the device, the received command being mapped to an activation of an associated button or other local UI feature of the mobile device by causing the receipt of the first command to locally generate, in the mobile device, a second command which can also be triggered by the direct local input via the UI.

13. The mobile arrangement of claim 12, whereby the mobile device includes a data storage component that stored related mapping information enabling the generation of at least one local command based on the received remote command.

14. The mobile arrangement of claim 12, wherein the RSM communicates with the interfacing logic by way of a proprietary protocol not supported by the communication application running on the mobile arrangement.

* * * * *